United States Patent Office 2,819,979
Patented Jan. 14, 1958

2,819,979
PLASTICIZERS FOR CELLULOSICS

Nelson G. Baumer, James Harper, and Gordon D. Hiatt, Rochester, N. Y., assignors to Eastman Kodak Company, Rochester, N. Y., a corporation of New Jersey No Drawing. Application February 17, 1956
Serial No. 566,099

10 Claims. (Cl. 106—186)

This invention relates to cellulose ester compositions plasticized with certain polynitriles.

In the preparation of cellulose esters for various uses, it is common practice in the art to modify them by the addition of materials having a plasticizing or softening action. It is a necessary requisite of these plasticizers that they be compatible over a fairly wide range, have good stability, low volatility, resistance to oxidation or migration on aging, be resistant to the leaching action of water and must not develop objectionable odors on standing.

If a plasticizer is not completely compatible in the proportions generally used with a cellulose ester, it will exude from a cast film or molded article to give an opaque appearance and an oily feel. Sometimes this occurs immediately, in other cases only after the molded article or cast film is allowed to stand for some time. In either case, the cellulose ester reverts to its original hardness and brittleness.

Low boiling plasticizers evaporate slowly on standing at room temperature or at temperatures at which the cellulose ester is subjected either in preparation or use. As a result, the cast film or molded article again becomes brittle and may easily crack or break. Films, lacquers, and molded articles may be subjected to water in their use. If the plasticizer is water soluble to even a small extent, the plasticizer may be leached out of the cellulose ester which then becomes hard and brittle. Other properties which may be desired of a plasticizer will depend on the end use of the cellulose ester or ether.

Several hundred plasticizers have been suggested for cellulose derivatives many of which are organic esters, but many of these plasticizers may not be used because they decompose so readily. We have found that certain polynitriles are excellent plasticizers for organic derivatives of cellulose, and are not easily decomposed.

One object of this invention is to provide a plasticizer for cellulosic derivatives which is resistant to decomposition by acids and alkalies. Another object of this invention is to provide a process for improving the properties of cellulose derivatives such as toughness, flexibility, elongation, and water resistance.

We have found that certain polynitriles make excellent plasticizers for cellulose derivatives. The following are illustrative examples of saturated polynitriles having the general structure.

$$NC(CH_2)_nCN$$

wherein $n$ is a number greater than 1. These nitriles include succinonitrile, glutaronitrile, adiponitrile, pimelonitrile, suberonitrile, azelonitrile, sebaconitrile, and the like. Ether nitriles may also be used such as those formed by reacting acrylonitrile with ethylene glycol and glycerol. The first material boils in the range of 150 to 165° C. at 1 mm., has a refractive index of 1.4475 and a density of 1.066 and may be illustrated by the following formula:

CH₂O CH₂CH₂CN
|
CH₂O CH₂CH₂CN

The trisubstituted material prepared from glycerol boils within the range of 210–330° C. at 1 mm. and has a refractive index of 1.461 and a density of 1.110 which may be illustrated by the following formula:

CH₂O CH₂CH₂CN
|
CHO CH₂CH₂CN
|
CH₂O CH₂CH₂CN

In both of these reactions the hydroxy groups should be essentially completely reacted to avoid water solubility. All of these nitriles are powerful solvents for cellulose derivatives and can be used in the cellulose materials when they are hot compounded to form molding compositions.

Cellulose derivatives include such well known compounds as cellulose acetate, propionate, butyrate, isobutyrate, mixed esters such as acetate-butyrate, acetate-propionate, cellulose ethers such as ethyl cellulose, and the like.

Plasticized cellulose derivatives according to this invention have many uses, for instance in coating on plastic compositions, with or without solvents such as esters, alcohols, hydrocarbons, mixed solvents, etc. Many other uses of plasticized cellulose derivatives are known in the art.

The proportions of nitrile to cellulose derivative in order to plasticize the derivative satisfactorily are dependent upon the particular cellulose derivative and the nitrile used. Generally the invention contemplates compositions containing from 5–50 parts of nitrile per 100 parts of cellulose derivative. The maximum amount of nitrile which can be used, can be determined in the light of the present specification by a person skilled in the art.

Cellulose derivatives may be admixed in any suitable manner with the nitriles disclosed herein such as milling together on heated rolls, dissolving in solvent mixtures or the like.

The following examples illustrate our invention but are not intended to limit its scope.

*Example I.*—A finely divided cellulose acetate analyzing 39.7% acetyl was dry mixed with 20, 40 and 60 parts of adiponitrile per 100 parts of cellulose ester. These mixes were then hot rolled to flux the compositions. The resultant compositions molded easily to give clear, flexible sheets.

*Example II.*—Experiment of Example I was repeated except that sebaconitrile was used as the plasticizer. Again good molding compositions were obtained which showed clarity and excellent flexibility.

*Example III.*—A solution was made of high acetyl cellulose acetate in methylene chloride: methanol—8:1 using a ratio of 65 parts of cellulose acetate to 35 parts of succinonitrile. This composition was coated on a smooth glossy surface and the solvent evaporated. The resulting film was flexible and clear.

*Example IV.*—A finely divided cellulose acetate butyrate was plasticized with an ether nitrile reaction product produced by reacting glycerol with acrylonitrile. Eighty parts by weight of cellulose acetate butyrate were mixed together with about 20 parts by weight of the ether nitrile and the mass stirred thoroughly until good mixing was obtained. This mass was then milled for about 30 minutes on 3" by 8" rubber mill rolls which were heated to about 300° F. The mass fused together on the rolls and was sheeted off at 250° F. to give a plastic sheet comprising 100 parts by weight of cellulose acetate butyrate and about 25 parts by weight of the ether nitrile. The sheets had excellent clarity, flexibility and toughness.

*Example V.*—Experiment IV was repeated except that the plasticizer used was prepared by reacting acrylonitrile with ethylene glycol. Similar results were obtained.

*Example VI.*—A finely divided cellulose acetate propionate having an average acetyl content of 30% and propionyl content of 17.5% was mixed with 50 parts of suberonitrile and this mixture was then hot rolled at a temperature of about 300° F. to flux the compositions. This material molded easily to give clear, flexible sheets.

*Example VII.*—A film of ethyl cellulose of 5 mil. thickness was prepared by casting the composition given below on a clear, glass plate with a doctor blade, followed by air drying for 48 hours at room temperature at a controlled rate to prevent blushing of the film.

|  | Parts |
|---|---|
| Ethyl cellulose | 15 |
| Glutaronitrile | 3 |
| Acetone | 50 |
| Ethyl acetate | 22 |
| Ethanol | 10 |

The film was then removed from the glass plate and further dried for two hours at 60° C. in the presence of free circulating air. A film of excellent flexibility, toughness and clarity was produced.

We claim:

1. A cellulose derivative selected from the group consisting of lower fatty acid esters of cellulose and lower alkyl ethers of cellulose containing only carbon, hydrogen, and oxygen in the molecule plasticized with a polynitrile selected from the class consisting of compositions having the following formula $$NC(CH_2)_nCN$$

in which $n$ is a number from 2–8, the reaction product of reacting essentially completely acrylonitrile with glycerol and the reaction product of reacting essentially completely acrylonitrile with ethylene glycol.

2. A composition according to claim 1 wherein the polynitrile is succinonitrile.

3. A composition according to claim 1 wherein the polynitrile is glutaronitrile.

4. A composition according to claim 1 wherein the polynitrile is adiponitrile.

5. A composition according to claim 1 wherein the polynitrile is azelonitrile.

6. A composition according to claim 1 wherein the polynitrile is sebaconitrile.

7. A composition according to claim 1 wherein said cellulose derivative is cellulose acetate butyrate.

8. A composition according to claim 1 wherein said cellulose derivative is cellulose acetate.

9. A composition according to claim 1 wherein said cellulose derivative is cellulose acetate propionate.

10. A composition according to claim 1 wherein said cellulose derivative is ethyl cellulose.

No references cited.